United States Patent [19]

Ciccozzi

[11] 4,333,486

[45] Jun. 8, 1982

[54] ELECTRONIC VALVE CONTROLLER

[75] Inventor: Frederick A. Ciccozzi, Erie, Pa.

[73] Assignee: Geosource Inc., Houston, Tex.

[21] Appl. No.: 184,347

[22] Filed: Sep. 5, 1980

[51] Int. Cl.³ .............................................. G05D 7/00
[52] U.S. Cl. ...................................... 137/1; 137/486; 137/487.5
[58] Field of Search ................ 137/486, 487.5, 1, 8, 137/14; 222/59; 73/199, 229

[56] References Cited

U.S. PATENT DOCUMENTS

| | | | |
|---|---|---|---|
| 3,219,046 | 11/1965 | Waugh | 137/486 X |
| 3,225,785 | 12/1965 | Goike | 137/486 |
| 3,230,767 | 1/1966 | Heigl | 73/198 |
| 3,344,805 | 10/1967 | Wapner | 137/486 |
| 3,369,561 | 2/1968 | Zimmerman | 137/486 |
| 3,690,115 | 9/1972 | Clayton | 137/486 |
| 3,696,830 | 10/1972 | Janu | 137/486 |
| 3,727,634 | 4/1973 | Nishizawa | 137/486 |
| 3,776,249 | 12/1973 | Wailes | 137/486 X |
| 3,792,713 | 2/1974 | Zadoo | 137/486 |
| 3,794,069 | 2/1974 | Gulick | 137/486 |
| 3,820,556 | 6/1974 | Millar | 137/486 X |
| 3,896,843 | 7/1975 | Millar | 137/486 |
| 3,941,148 | 3/1976 | Lerner | 137/486 |
| 4,011,757 | 3/1977 | Baatz | 73/199 |
| 4,057,173 | 11/1977 | Tal | 222/59 X |
| 4,058,286 | 11/1977 | Berger | 137/486 X |
| 4,134,423 | 1/1979 | Mayer | 137/486 |
| 4,146,051 | 3/1979 | Sparks | 137/486 |

Primary Examiner—Alan Cohan
Attorney, Agent, or Firm—Arnold, White & Durkee

[57] ABSTRACT

An electronic valve controller for controlling a meter valve system is disclosed. The electronic controller includes circuitry for enabling a multilevel shutdown of a meter valve system. The meter valve system includes a preset batch counter, positive displacement meter and diaphragm operated globe valve. The electrical circuitry is operatively associated with the meter valve system in enhancing and inhibiting the flow through the globe valve based upon a comparison of a preset desired flow rate and the actual system flow rate.

22 Claims, 4 Drawing Figures

ELECTRONIC VALVE CONTROLLER

BACKGROUND OF THE INVENTION

The invention generally relates to a controlled meter valve flow system and more particularly relates to an electronically controlled meter valve flow system.

During the course of loading large reservoirs, such as tank trucks for example, with a fluid material problems arise at initial loading, i.e. splashing and vapor generation; and, again during the shutdown cycle from shock waves in the system due to high flow rate at or near full capacity.

Special fluid flow networks have been devised to assist in loading these reservoirs without undue splashing, vapor generation or shock. Flow network systems that are generally used for filling large reservoirs such as tankers may be generally referred to as load rack systems. Presently, in the load rack systems globe valves are used to stop fluid flow into the reservoir. This shutdown is presently accomplished with a series of pilot valves associated with the globe valves which are hydraulically actuated. In order to actuate the pilot valves there must be a pressure drop across the globe valve of approximately 8-10 psi. Once the pilot valves are actuated in a predetermined sequence the flow rate will be decreased to one final rate then shut off.

Many problems have arisen in the use of the pilot valves including freezeups due to the many secondary loops to the main globe valve, wear of the pilot valves, high maintenance costs, and difficulty of adjustments which are critical to the overall operation of the globe valve.

In order to determine the volume going through the fluid flow network or load rack a turbine meter is often utilized to determine flow rate and volume. The range of the turbine meter is limited to between 100 and 1000 gallons per minute.

Positive displacement meters (PDM) are also utilized in determining volume through a fluid flow network. The PDM differs from the turbine meter in that it is compartmentalized, which facilitates the determination of volume through the system. Thus, any movement of the shaft within the positive displacement meter is indicative of a specific volume of fluid through the meter. Controlling startup and shutdown of fluid flow networks have been accomplished using globe valves with pilot valve controls whereby the volume or flow rate is determined in either a turbine meter or a positive displacement meter. The present invention overcomes the problems enunciated above for the pilot valves by eliminating the large pressure drop required in the pilot valve system. This uses less energy from the prime mover, resulting in a more efficient system and lowering the overall operating cost.

SUMMARY OF THE INVENTION

The valve controller of the present invention provides for electronically controlling a globe valve in a meter valve system. The globe valve has an hydraulically actuated diaphragm and is solenoid controlled in response to the flow rate detected in the meter valve system.

In accordance with the present invention a diaphragm operated globe valve is utilized to control fluid in a fluid flow network, i.e. a series of pipe connections, or load rack connections for use in filling a reservoir. The diaphragm operated globe valve is used to initiate flow into the reservoir and shut down flow after the reservoir is filled. Flow rate is monitored by a meter valve system also connected into the fluid flow network. The meter valve system is located upstream from the diaphragm operated globe valve.

In the meter valve system a positive displacement meter is used to determine volume of fluid passing a given point in the fluid flow network. A preset batch counter and meter calibrater is interconnected to the fluid flow network through the positive displacement meter for setting a desired volume of fluid to be passed through the fluid flow network into the reservoir.

The present invention includes an electronic valve controller electrically connected to the fluid flow network with the preset batch counter for controlling the operation of the diaphragm operated globe valve. The electronic controller includes an optical switch with an integral light source and light sensor. The electronic controller also includes a multi-apertured disc mounted on a shaft which is operatively associated with the positive displacement meter. A control circuit is utilized for initiating a multilevel shutdown of the flow through the fluid flow network. A first trip switch electrically responsive to the preset batch counter and connected to the electronic control circuit for initiating a multilevel shutdown. A second trip switch electrically responsive to the preset batch counter and connected to the electronic control circuit is available for emergency shutdown to the control circuit to immediately stop fluid flow in the fluid flow network.

In the preferred embodiment of the present invention the optical switch assembly comprises an integral light source and light sensor assembly and a slotted disc mounted to an extension of the shaft of the positive displacement meter; whereby the rotation of the meter causes said optical switch to generate a series of digital pulses indicative of volume thru the positive displacement meter. The electronic circuit of the electronic controller in accordance with the present invention, further includes pulse shaping and noise rejection circuitry connected to the optical switch for converting the digital pulses to high level noise free digital pulses. A system clock in included in the circuit for synchronous circuit operation. The system clock may have a means for adjusting timing within the system.

The electronic controller circuitry is further provided with synchronization circuitry connected to the system clock and pulse shaping and noise rejection circuitry for sampling and holding the digital pulses such that the falling edge of the digital pulse are coincident with system clock pulses. A means for generating a time base connected to the system clock is also provided. Pulse accumulator circuitry is utilized to count and store the digital pulses generated by the optical switch assembly over this time base providing data indicative of actual flow rate.

Finally, the circuitry includes control logic circuitry connected to the meter valve system through the first trip switch for generating flow rate signals. The control logic circuitry enables high and low flow switches representing the desired flow rate within the fluid flow network and further initiates multilevel shutdown circuitry. A digital comparator is utilized to compare the desired flow rate with the actual flow rate. Based upon the result in the digital comparator logic circuit a solid state relay drive logic circuit is enabled which will open or close the appropriate solinoids in the diaphragm operated globe valve.

The circuitry for the electronic control of the meter valve system may also include a means for generating a low flow input signal to the control circuit for holding the flow rate at a predetermined low value.

The low flow switch is connected to the control circuit which may include a binary counter and switch interface for providing a fixed low flow threshold that, when reached, will initiate a signal to initiate a flow rate.

A method of electronically controlling a fluid flow network is also provided in accordance with the present invention. This method includes monitoring the fluid flow in the flow network using a positive displacement meter in conjunction with a preset batch counter. Further steps in this method include generating digital pulses representative of flow rate in the flow network using an optical switch assembly in conjunction with the positive displacement meter and electronically controlling a solenoid activated globe valve disposed downstream in the fluid flow network in response to digital pulses generated by the optical switch assembly.

In the preferred method of the present invention for electronically controlling the flow meter valve system the solenoid activated valve is controlled by synchronizing the digital pulses received from the optical assembly to a system clock frequency, accumulating these pulses in a pulse accumulator over a predetermined time base and storing a desired flow rate. The preferred method further includes comparing the number of digital pulses accumulated over the time base against the desired flow rate data and generating a signal indicative of the difference, if any. The final step in the method includes generating a signal in response to the comparison of actual to desired flow rate and delivering a pulse to solid state relays for enabling or disabling the solenoids in the solenoid actuated globe valve. The method may further include generating a low flow rate signal to hold the flow to a predetermined value.

It is the principal feature of the present invention to provide an electronic controller for a meter valve system using a positive displacement meter and preset batch counter for initially monitoring the volume and flow rate in the fluid flow network.

It is a further feature of the present invention to provide an electronic circuit capable of initiating a multilevel shutdown of the fluid flow network to avoid splashing and fluid shock within the network.

BRIEF DESCRIPTION OF THE DRAWINGS

Other features and advantages of the present invention will become apparent from the following more detailed description in conjunction with the drawing figures where like numerals represent like parts in which.

DETAILED DESCRIPTION

The electronic controller of the present invention is utilized in a meter valve fluid flow system. The meter valve fluid flow system may have as its main function the filling of a reservoir with a fluid material. The present invention overcomes the problems associated with filling a reservoir with a fluid material such as splashing and vapor generation of highly volatile chemicals by electronically controlling the flow rate through the meter valve system. This electronic control not only allows for a low flow start leading up to a high flow rate during the filling step, but also allows for a multilevel shutdown. The multilevel shutdown is triggered when the reservoir is filled to within a predetermined number of gallons, as for example 30 gallons. The controller will then decrement the flow rate in steps to reduce shock or splashing in the system.

Figure 1:
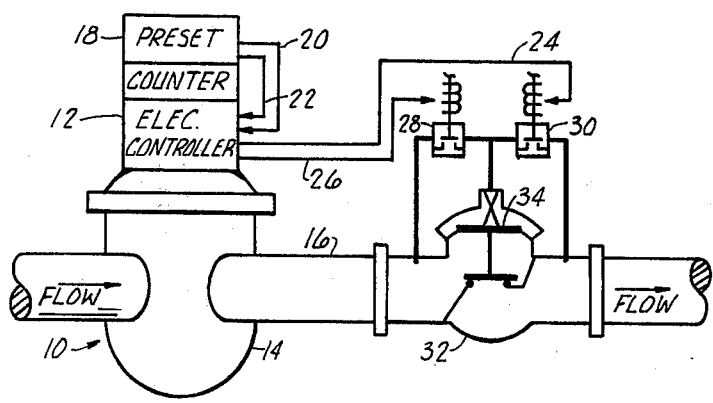
FIG. 1 is a partial pictorial partial block diagram view of a meter valve system utilizing an electronic controller.

Referring now to the figures and more specifically to FIG. 1 where a meter valve system 10 utilizing an electronic valve controller 12 is shown. The meter valve system 10 includes a positive displacement meter 14 connected to a fluid flow network 16. The fluid flow network 16 receives fluid from a storage area (not shown) upstream from the positive displacement meter 14.

A preset batch counter 18 is also included in the meter valve fluid flow system 10. The preset batch counter 18 is electrically connected to the electronic valve controller 12 through electrical connectors 20 and 22.

The valve controller 12 delivers signals through electrical connectors 24 and 26 to upstream and downstream solenoids 28 and 30 respectively.

The upstream and downstream solenoids 28 and 30 control a diaphragm operated globe valve 32 which is also interconnected into the fluid flow network 16; but downstream from the positive displacement meter 14. It is the function of the diaphragm operated globe valve 32 to control flow rate in the fluid flow network 16 which is delivering fluid to a reservoir (not shown) downstream.

The activating and deactivating of the upstream and downstream solenoids 28 and 30 will cause a change in pressure across the diaphragm 34 of the globe valve 32 initiating an upward or downward movement of the diaphragm 34 within the globe valve 32. Any upward movement of the diaphragm 34 will cause the fluid to flow through the globe valve 32 while any downward movement of the diaphragm will close the valve 32 and thus inhibit flow through the fluid flow network 16.

Figure 2:
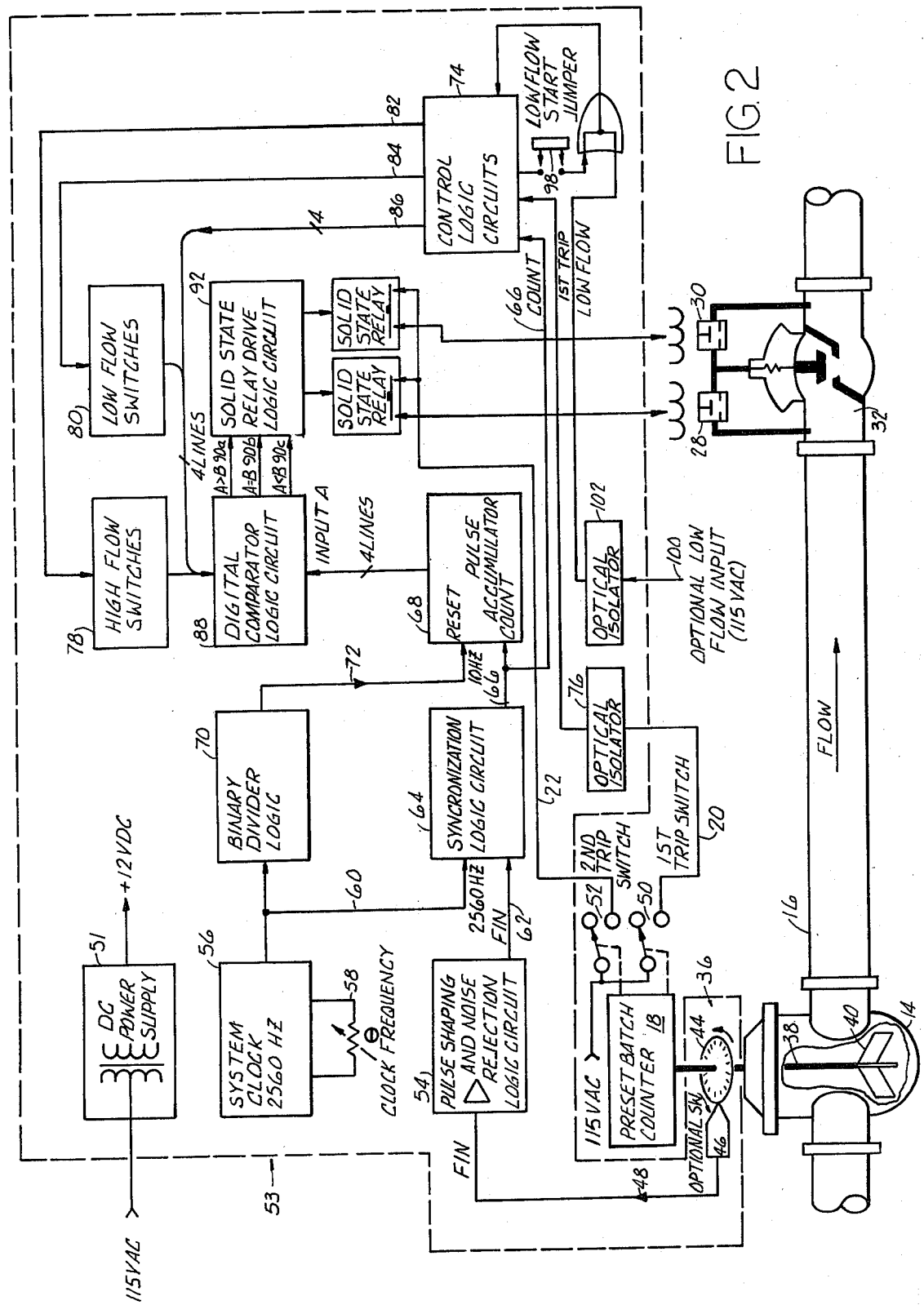
FIG. 2 is a partial pictorial partial block diagram view of the electronic controller including an electronic circuit utilized in the control of a meter valve system in accordance with the present invention; and, FIG. 3 is a graphical view of a system flow profile illustrating the multilevel shutdown and startup in accordance with the electronic control of a meter valve system of the present invention.

The electronic valve controller 12 shown in FIG. 1 is further illustrated in block diagram form in FIG. 2. As seen from FIG. 1 the electronic valve controller 12 is operatively associated with both the positive displacement meter 14 and the preset batch counter 18. The initial component of the valve controller 12 is an optical switch assembly 36. FIG. 2 further demonstrates a shaft 38 extending from the central portion of the positive displacement meter 14. The shaft 38 as shown in the cutaway view of the positive displacement meter in FIG. 2 extends centrally through the positive displacement meter 14 and has vanes 40 attached thereto also enclosed in the housing 42 of the positive displacement meter 14. The vanes 40 are utilized for compartmentalizing or sectioning off the positive displacement meter 14 making it an indicator of volume as well as flow rate of the fluid through the fluid flow network 16.

The optical switch assembly 36 includes a slotted disc 44 attached to the shaft 38 of the positive displacement meter 14. An optical switch 46 which is located adjacent to the shaft 38 so that when the shaft 38 rotates the optical disc 44 light impulses are generated. The optical switch 46 will sense the light impulses given off by the slotted disc 44 and translate these impulses into electrical digital pulses 48.

To further activate the circuit for the electronic controller 12 first and second trip switches 50 and 52 are closed feeding an appropriate AC signal to the circuit by way of conductors 20 and 22 respectively. Opening of the first trip switch 50 will place the circuit 53 of the electronic controller 12 into a shutdown mode and activate the appropriate multilevel shutdown circuitry. Opening of the second trip switch 52 will cause a shutdown of the system by appropriately opening the solenoid actuated valves to close the globe valve 32.

DC power supply 51 is used to provide +12 VDC to all logic circuits.

The meter valve system 10 is shown in a "no flow" condition. The upstream solenoid valve 28 is open and the downstream solenoid valve 30 is closed. In this condition the upper cavity of the valve 32 is open to the upstream process conditions. Since the pressure above and below the diaphragm 34 is the same, a spring between the diaphragm and meter housing will cause the diaphragm 34 to close off the opening through the valve 32.

Once the first and second trip switches 50 and 52 are closed, the controller circuitry 53 responds by reversing the conditions of the valve solenoids 28 and 30, causing the globe valve 32 to open. Operationally, at this point the slotted disc 38 located on the positive displacement meter 14 will begin to rotate proportional to the flow through the fluid flow network 16. The optical switch assembly 36 will deliver digital pulses 48 from the optical switch 46 to a pulse shaping and noise rejection logic circuit 54. In this circuit the pulses are shaped and processed by a noise rejection amplifier, for example, a voltage comparator with hysteresis. As a result of this processing the meter digital pulses 48 are now high level and noise free. These pulses 48 still have a considerable amount of jitter due to the varying angular velocity of the positive displacement meter shaft 38 and subsequently the slotted disc 44 generating the light pulses that are directly analogous to the digital pulses 48.

To overcome this jitter in the circuit logic a system clock frequency is generated. A system clock 56 generates a signal 60 at a predetermined frequency. In the preferred embodiment this predetermined frequency is 2560 Hz. The system clock 56 may also have a means for adjusting the clock frequency 58. The system clock frequency signal 60 and the output 62 of the pulse shaping and noise rejection circuit 54 are delivered to a synchronization logic circuit 64. The synchronization circuit 64 is a sample and hold type of logic circuit which synchronizes the digital pulse 62 to the system clock signal such that the falling edge of the digital pulse 62 is coincident with the clock pulse 60. This insures repeatability in the count circuits and improves system accuracy. One criteria for the system clock 56 is that the frequency be twice that of the maximum frequency from the optical disc 44.

Thus, the synchronization circuit 64 will deliver a series of reliable digital pulses 66 indicative of the flow rate through the positive displacement meter 14. These digital signals 66 are accumulated in a pulse accumulator circuit 68. The pulses 66 are accumulated over a predefined time base. In the preferred embodiment a binary divider logic circuit 70 is provided for dividing the system clock frequency 60 by 256. This results in a signal 72 having a 10-Hz frequency. The time base for flow rate calculation is established by dividing the system clock by 256 resulting in a time base of 0.1 seconds. The digital pulses 66 are thus accumulated in the pulse accumulator circuitry 68 for 0.1 seconds and stored.

A control logic circuit 74 is included in the circuit 53 for generating signals to enable appropriate switches indicative of desired flow rate in the fluid flow network 16. The control logic circuit 74 is electrically connected to the synchronization circuit 64 and receives digital pulse 66 for counting purposes. The control logic circuit 74 is also connected to the first trip switch 50 through an optical isolator 76 for enabling the circuitry utilized in the multilevel shutdown of the fluid flow network 16.

High and low flow switches 78 and 80 are provided for generating signals indicative of desired flow rate through the system 16. High and low flow switches 78 and 80 receive enabling signals 82 and 84 from the control logic circuit 74. These switches may be manually set in the field to a predetermined high and low flow rate respectively. The control logic circuit 74 also includes a means, shown in FIG. 4 and described below, for generating a series of decrementing flow rate values to achieve a multilevel shutdown of the fluid flow network 16. The means for generating the multilevel flow rates generate signals 86 indicative of these flow rates.

Circuitry 88 is provided for comparing the desired and actual flow rates in the fluid flow network 16. This circuitry may be in the form of a digital comparator logic circuit and is electrically connected to the pulse accumulator 68 for receiving the actual flow rate and to any of the high or low flow switches 78 or 80 or the means for generating a multilevel shutdown found in control logic circuit 74. Thus the digital comparator 88 will compare the desired high flow rate from high flow rate switch 78 and the actual flow rate accumulated in the pulse accumulator 68 over the time base indicated by the 10 hz signal 72. The digital comparator 88 will then send signals 90a–c representative of the difference if any between the desired and actual flow rate. These signals are delivered to solid state relay drive logic circuit 92, which in turn activates solid state relays 94 and 96. These solid state relays are electrically connected to the upstream and downstream valve solenoids 28 and 30 for controlling the globe valve 32.

The pulse accumulator 68 may be a 6-bit binary counter with the first two bits of the counter ignored for purposes of the circuitry logic 53. The digital comparator 88 compares the four most significant bits of the pulse accumulator 68 to four binary switch or logic states as determined by signals from the control logic 74 either indicating a multilevel shutdown or enabling the high or low flow switches 78 or 80.

In the preferred embodiment each pulse width is given as 1/40th of a gallon, therefore in 0.1 seconds each accumulator count will be equivalent to a flow rate of 15 gallons per minute. Since the first two bits are ignored, the bandwidth of uncertainty of comparison becomes 45 gallons per minute or statistically plus or minus 22.5 gallons per minute around the switch or logic states from the control logic circuit 74. The meter valve system is not limited to any particular flow rate since the number of slots in the disc and the time base are variables determined by the valve size and application. A typical maximum flow rate for a system described above (1/40th of a gallon in 0.1 seconds) is 800 gallons per minute with plus or minus 3% error.

Once the digital comparator 88 has made a flow rate versus flow setting decision, the result is stored until the next comparison is made 0.1 seconds later. During the time a flow decision is being made, the solid state relays 94 and 96 and drive circuit 92 hold the valve solenoids 28 and 30 in the appropriate condition based on the previous flow decision. Utilizing this technique, the globe valve 32 is modulated maintaining a prescribed flow rate.

When the controller 12 senses that the flow rate is within the range selected by the flow switches 78 or 80, the valve is held in hydraulic lock for a variable period of time. This time may be adjustable ranges from 0.7 to 2 seconds for example and is used to allow system pressure spikes that is rapid pressure fluctuations to settle before another flow decision is made.

Completing the operational description, the controller 12 will continue the process described until the first trip switch 50 is opened. At this time the control logic 74 initiates the multilevel shutdown circuitry keeping track of volume throughput and sequentially reduces system flow in steps until all flow is terminated by the opening of the second trip switch 52. Although flow decisions are still made every 0.1 seconds the time delay for hydraulic lock purposes is inhibited during the step-down procedure.

The controller 12 may also incorporate optional features that would alter the preferred embodiment described above. Both these features are field activated. The first is a low flow start which maintains the system flow at the rate specified by a low flow switch. When the first trip switch 50 is closed and the low flow jumper 98 is closed, the control logic 74 enables the low flow switches 80. Volume throughput is calculated and compared to a predetermined value set in binary switches (not shown in FIG. 2). When this value is reached, the control logic 74 enables the high flow switch 78 and the system 16 goes to a high flow rate. This feature prevents splashing and static buildup by filling a compartment at a lower rate for a predetermined volume.

The low flow rate can be permanently held by applying a 115 VAC to the low flow input. The low flow rate signal 100 is optically isolated through an optical isolator 102 and delivered to the control logic circuit 74 in a manner similar to the isolation of the first trip switch 50.

Figure 3:
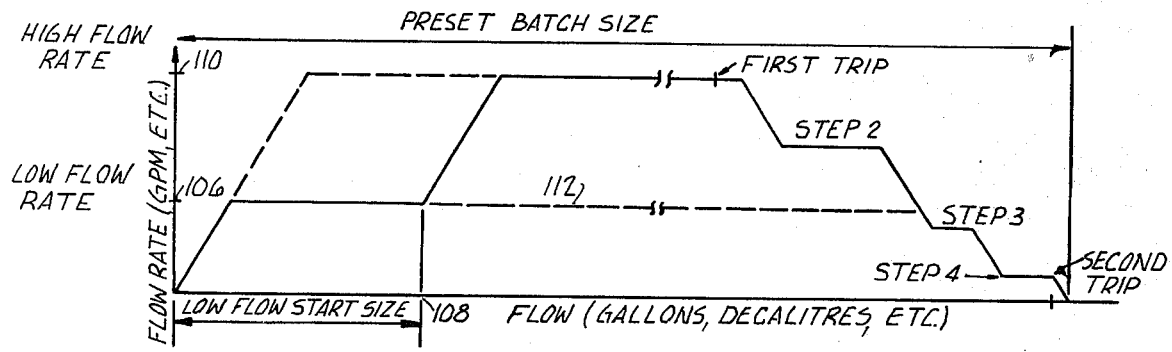

FIG. 3 is a graphical representation of the multilevel shutdown that is effected by the opening of the first trip switch 50. The system flow profile charts the flow rate versus the volume of fluid in the system. The control circuit 53 provides for an initial low flow start 104 to a predetermined low flow rate 106. This flow rate is held until a threshold volume 108 is reached. At that point in time the high flow rate switch 78 shown in FIG. 2 is activated and the system increases in rate until it achieves the high flow rate 110. The system is held at this rate until the first trip switch 50 is opened when a predetermined number of gallons is achieved. After the first trip switch 50 is opened the control logic circuitry 74 goes into a multilevel shutdown whereby the flow rate is decremented in four steps as shown in the graph of FIG. 3. After the fourth level is achieved the second trip switch 52 is opened and the system goes into complete shutdown. It is to be noted that with the optional low flow rate input the low flow rate 106 may be achieved during the entire cycle as indicated by the dotted line 112.

Figure 4:
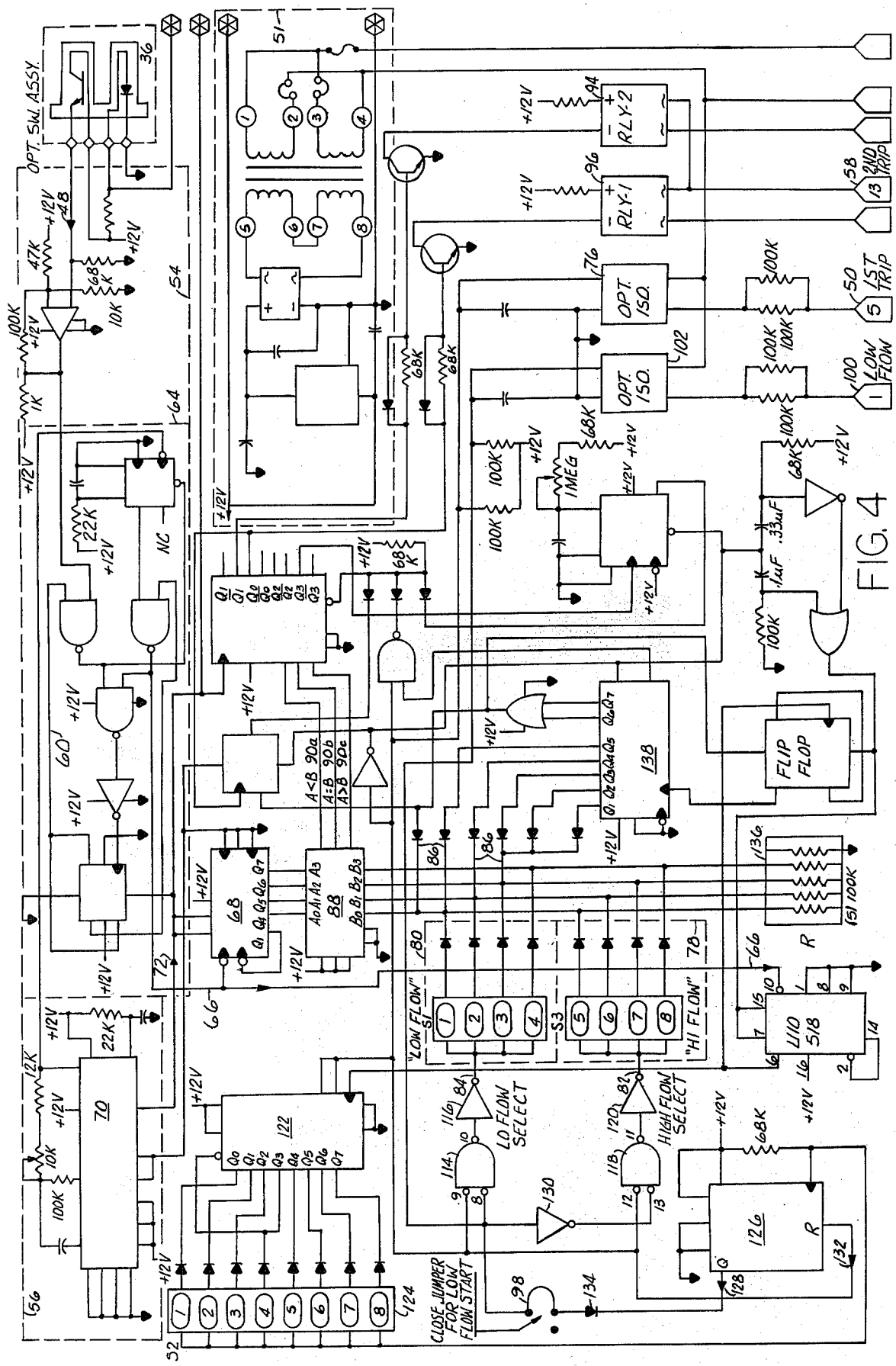
FIG. 4 is a detailed electrical schematic and block diagram of the electronic circuit utilizing the electronic control of the meter valve system in accordance with the present invention.

FIG. 4 represents a detailed electronic circuit of the circuitry 53 illustrated in block diagram form in FIG. 2. The DC power supply 51 is shown to provide the 12 volt source to the logic circuitry illustrated. For convenience the same numbering system utilized for the block diagram 53 FIG. 2 is used with regard to the description of the circuit of FIG. 4. Only those elements not provided in the diagram of FIG. 2 will be addressed.

After the first and second trip switches 50 and 52 are closed a low signal is placed on the negative 'AND' gate 114 at pin 9. This gate is part of the circuitry including an inverter 116 leading to the signal 84 delivered to the low flow switch 80. Similarly a negative 'AND' gate 118 is utilized in conjunction with an inverter 120 for delivering a signal 82 to the high flow switch network 78. The closing of the first and second trip switches 50 and 52 also provides a low signal on the negative 'AND' gate 118 at pin 12, as well as enabling a binary counter 122 which stores a threshold value for activating the high flow switch 78 when the low flow start option is utilized. The binary counter 122 may be a Motorola model 14520MCB dual 4-bit binary counter. When the low flow start is utilized a switch network 124 is set for a predetermined threshold indicative of the volume desired for moving from low flow rate to high flow rate. This switching network 124 provides a signal to a flip-flop element 126 which will yield as an output at pin 13 a low signal 128, delivered when the jumper 98 is closed, to the negative 'AND' 114. This yields a low signal at pin 10 of gate 114 which is inverted by the inverter 116 and delivered as an enabling signal 84 to the low flow switch 80. The signal 128 delivered to pin 8 of gate 114 is also delivered through inverter 130 to negative 'AND' 118 thus providing a high signal at pin 13 of gate 118 which will deliver a high signal to the inverter 120 and thus will not provide an enabling signal to the high flow switch 78.

Once the threshold limit stored in binary counter 122 is reached a high signal will be delivered to the flip-flop 126 and delivered through the output at pin 10 to pin 12 of the negative 'AND' 118. This low signal will provide a low signal at pin 11 of the gate 118 which when inverted at the inverter 120 will provide an enabling signal 82 to the high flow switch 78.

Both the high and low flow switches 78 and 80 provide signals to the digital comparator 88 representative of the desired flow rate in the system. While the high switch 78 is being activated by a signal 132 from pin 10 of flip-flop 126, blocking diode 134 will inhibit the signal 128 from activating the low flow switch 80.

A pull down resistor bank 136 is connected to the comparator 88 to assure zero readings at the pins $B_0-B_3$ which receive the desired flow rate from the high and low flow switches 78 and 80 and the multilevel shutdown signals 86.

The low flow rate may be retained over the entire duration of the filling cycle by initiating the optional low flow input circuitry which includes a signal 100 optically isolated through an optical isolator 102. This signal 100 provides a low on the negative 'AND' gate 114 at pin 8. This, in combination with the activation of the first trip switch 50, which places a low at pin 9 of the negative 'AND' gate 114, produces a low signal at pin 10 which when inverted by invertor 116 produces an enabling signal 84 to the low flow switch. Since the inverter 130 will continually invert the low signal produced by activating the low flow switch 100 a high signal will be placed on the negative 'AND' 118 at pin 13 thus deactivating the high flow circuitry 78 for the entire duration of the filling process.

When a predetermined volume has passed through the fluid flow network 16 depicted in FIGS. 1 and 2, which is registered in the preset batch counter 18 the first trip switch 50 is opened activating the multilevel shutdown logic of the control circuit 74. As shown in FIG. 4 this multilevel shutdown logic includes a binary counter 138 which may be a 'Johnson' counter where the highs on each of the pin $Q_1$-$Q_7$ are mutually exclusive; and each pin representing a five gallon increment. Pins $Q_1$-$Q_3$ are electrically tied such that there is a constant signal representative of the same volume for fifteen gallons in the preferred embodiment. The control logic circuit 74 monitors the actual flow rate and synchronizes signals sent to the comparator 88 at pins $B_0$-$B_3$ with those signals sent by the pulse accumulator 68 to the comparator 88 via pins $A_0$-$A_3$. The counter 138 places a 4-bit binary number on lines going into pins $B_0$-$B_3$ which are representative of a decrementing flow rate as a function of increased volume in the system. In the preferred embodiment the 'Johnson' counter will change flow rates in four decrementing steps with the first occurring after a fifteen gallon limit, the second after twenty gallons, the third after a twenty-five gallons and the fourth change in flow rate after the thirtieth gallon. It is also noted that pins $Q_6$ and $Q_7$ are electrically tied. Thus, operationally the control circuit will be placed in a multilevel shutdown mode when the preset batch counter comes within thirty gallons of the desired volume to be delivered to a reservoir. The preset batch counter 18 at that time will open the first trip switch 50 thus enabling the control circuitry 74 including the 'Johnson' counter 138 to decrement the desired flow rate delivered to pins $B_0$-$B_3$ in the comparator 88.

While the invention has been described and illustrated with respect to a preferred embodiment it will be understood many modifications and changes may be made by those skilled in the art within the spirit and scope of the appended claims. For example, the multilevel shutdown circuitry found in control circuitry 74 may have any number of steps to decrement the desired flow rate to be compared in the digital comparator circuit with the actual flow rate accumulated by pulses delivered to the pulse accumulator 68. Also, the low flow start capability and low flow input holding the system in the low flow mode are optional as stated above.

What is claimed:

1. A circuit for electronic control of a meter valve system comprising:
    an optical switch assembly for monitoring flow through the system, said optical switch assembly generating digital pulses in response to flow rate of a fluid within said system;
    a power supply for supplying DC power to said circuit;
    pulse shaping and noise rejection circuitry, electrically connected to said optical switch assembly for converting said digital pulses to high level noise free digital pulses;
    a system clock generating clock pulses for synchronizing said circuit operation, having a means for adjusting frequency;
    synchronization circuitry, electrically connected to said system clock and said pulse shaping and noise rejection circuitry, for sampling and holding said digital pulses such that the falling edge of said digital pulses are coincident with said system clock pulses;
    means electrically connected to said system clock for generating a time base;
    pulse accumulator circuitry electrically connected to said synchronization circuitry for counting and storing digital pulses over said time base whereby said digital pulses are indicative of actual system flow rate;
    control logic circuitry electrically connected to said meter valve system and said synchronization circuitry for generating flow rate signals, based upon data from said meter valve system and generating multilevel shutdown signals based upon a predetermined count of said digital pulses;
    means for storing logic data representing a desired flow rate, said means enabled by said flow rate signals from said control logic circuitry;
    means for comparing said desired flow rate with said actual flow rate, electrically connected to said control logic circuitry said means for storing data representative of said flow rate and said pulse accumulator circuitry; and
    means for enabling a solenoid activated valve in said meter valve system, electrically connected and responsive to signals from said means for comparing.

2. A circuit for electronic control of a meter valve system as set forth in claim 1 wherein said means for storing logic data representing desired flow rate comprises low and high flow registers for storing logic data representing low and high flow rates wherein said flow registers are enabled by said flow rate signals.

3. A circuit for electronic control of a meter valve system as set forth in either of claims 1 or 2 wherein said means for comparing comprises a digital comparator.

4. A circuit for electronic control of a meter valve system as set forth in either of claims 1 or 2 wherein said means for enabling a solenoid activated valve comprises a solid state relay drive logic circuit and a series of solid state relays electrically connected to the solenoids of said valve.

5. A circuit for electronic control of a meter valve system as set forth in claim 1 wherein the frequency of said system clock is 2,560 Hz.

6. A circuit for electronic control of a meter valve system as set forth in claim 1 wherein said means for generating a time base comprises binary divider circuitry electrically connected to said system clock.

7. A circuit for electronic control as set forth in claim 6 wherein said binary divider circuitry comprises circuitry for dividing by 256.

8. A circuit for electronic control of a meter valve system comprising:
    an optical switch assembly for monitoring flow through said meter valve system, said assembly generating digital pulses in response to flow rate of a fluid within said system;
    means for providing DC power to said circuit;

a system clock generating clock pulses for synchronizing said circuit operation having a means for adjusting frequency;

synchronization circuitry electrically connected to said system clock for sampling and holding said digital pulses received from said optical switch assembly such that the falling edge of said digital pulses are coincident with said system clock pulses;

binary divider circuitry electrically connected to said system clock for generating a time base;

pulse accumulator circuitry electrically connected to said synchronization circuitry for counting and storing said digital pulses over said time base whereby said digital pulses are indicative of actual system flow rate;

control logic circuitry electrically connected to said meter valve system and said synchronization circuitry for generating flow rate signals, based upon data from said meter valve system and generating multilevel shutdown signals based upon a predetermined count of said digital pulses;

means for storing logic data representing desired flow rate, said means enabled by said flow rate signals from said control logic circuit;

means for comparing said desired flow rate and said actual flow rate; and means for enabling a solenoid activated valve in said meter valve system electrically connected and responsive to signals from said means for comparing.

9. A circuit for electronic control of a meter valve system as set forth in claim 7 wherein said means for comparing comprises a digital comparator electrically connected to said control logic circuitry, said means for storing data logic representing desired flow rate and said pulse accumulator circuitry.

10. A circuit for electronic control of a meter valve system as set forth in either of claims 1 or 7 wherein said optical switch assembly comprises a light source, a slotted disc mounted to the shaft of a positive displacement meter and responsive to fluid flow through said positive displacement meter; and an optical switch adjacent to said slotted disc for detection of light impulses through said slotted disc, said optical switch generating a series of digital pulses in response to said light impulses.

11. A circuit for electronic control of a meter valve system as set forth in either of claims 1 or 7 further including means for generating a low flow input signal to said control logic circuit, for holding said flow rate at a predetermined value.

12. A controlled fluid flow system comprising:
a meter valve system including;
a fluid flow network;
a positive displacement meter for monitoring fluid flow through the system, said positive displacement meter having a shaft with a plurality of vanes attached thereto enclosed in a housing and disposed in the fluid flow network to allow fluid flow therethrough,
a preset batch counter for storing data indicative of fluid volume desired, operatively associated with said shaft of said positive displacement meter to record and compare present volume to desired volume;
a solenoid activated valve disposed within said fluid flow network downstream from said positive displacement meter;
a power supply for supplying DC power;
an optical switch assembly connected to said shaft of said positive displacement meter, monitoring movement of said shaft resulting from fluid flow, and generating digital pulses in response to said movement;
electronic control circuit means electrically connected to said optical switch assembly for enabling said solenoid activated valve in response to flow rate in said fluid flow network;
a first trip switch electrically responsive to said preset batch counter and electrically connected to said electronic control circuit means for initiating a multilevel shutdown flow rate signal for inhibiting flow through the fluid flow network; and
a second trip switch electrically responsive to said preset batch counter and electrically connected to said electronic control circuit means for enabling said solenoid activated valve for emergency shutdown of said fluid flow system.

13. A flow control system as set forth in claim 11 further including an optical isolator operably associated with said first trip switch and disposed in the connection between said first trip switch and said electronic control circuit means.

14. A flow control system as set forth in claim 11 wherein said solenoid activated valve is a diaphragm operated valve.

15. A flow control system as set forth in claim 11 wherein said optical switch assembly is connected to said positive displacement meter and includes a light source, a slotted disc mounted on the shaft of said positive displacement meter and operatively associated with said light source, and an optical switch located adjacent to said slotted disc for detecting light impulses through said disc representative of movement of said shaft resulting from fluid flow and generating digital pulses in response to said light impulses.

16. A flow control system as set forth in claim 11 wherein said electronic control circuit means comprises:
a power supply for providing DC power;
pulse shaping and noise rejection circuitry, electrically connected to said optical switch assembly for converting said digital pulses to high level noise free digital pulses;
a system clock generating clock pulses for synchronizing said circuit operation, having a means for adjusting frequency;
synchronization circuitry, electrically connected to said system clock and said pulse shaping and noise rejection circuitry, for sampling and holding said digital pulses such that the falling edge of said digital pulses are coincident with said system clock pulses;
means electrically connected to said system clock for generating a time base;
pulse accumulator circuitry electrically connected to said synchronization circuitry for counting and storing digital pulses over said time base whereby said digital pulses are indicative of actual system flow rate;
control logic circuitry electrically connected to said meter valve system and said synchronization circuitry for generating flow rate signals, based upon data from said meter valve system and generating multilevel shutdown signals based upon a predetermined count of said digital pulses;

means for storing logic data representing a desired flow rate, said means enabled by said flow rate signals from said control logic circuitry;

means for comparing said desired flow rate with said actual flow rate, electrically connected to said control logic circuitry, said means for storing data representative of said flow rate and said pulse accumulator; and means for enabling a solenoid activated valve in said meter valve system, electrically connected and responsive to signals from said means for comparing.

17. A flow control system as set forth in claim 11 wherein said solenoid activated valve is a globe valve.

18. A flow control system as set forth in claim 11 further including a means for generating a low flow input signal to said electronic control circuit means for holding said flow rate at a predetermined value.

19. A circuit for multilevel shutdown of a meter valve fluid flow system comprising:

a power supply for supplying DC power to said circuit;

an optical switch assembly for monitoring flow through said system and generating digital pulses in response to flow rate of fluid in said flow system;

pulse shaping and noise rejection circuitry, electrically connected to said optical switch assembly for converting said digital pulses to high level noise free digital pulses;

a system clock generating clock pulses for synchronizing said circuit operation, having a means for adjusting frequency;

synchronization circuitry, electrically connected to said system clock and said pulse shaping and noise rejection circuitry, for sampling and holding said digital pulses such that the falling edge of said digital pulses are coincident with said system clock pulses;

means electrically connected to said system clock for generating a time base;

pulse accumulator circuitry electrically connected to said synchronization circuitry for counting and storing digital pulses over said time base whereby said digital pulses are indicative of actual system flow rate;

means connected to said meter valve system and said synchronization circuitry for sequentially decrementing the flow rate in said flow system by generating a series of signals representative of the decrementing flow rates for multilevel shutdown of said system;

means for comparing said desired flow rate with said actual flow rate, electrically connected to said means for decrementing said desired flow rates and said pulse accumulator circuitry; and means for enabling a solenoid activated valve in said meter valve system, electrically connected and responsive to signals from said means for comparing.

20. A controlled fluid flow system comprising:
a meter valve system including;
a fluid flow network;
a positive displacement meter for monitoring fluid flow through the system, said positive displacement meter having a shaft with a plurality of vanes attached thereto enclosed in a housing and disposed in the fluid flow network to allow fluid flow therethrough, a preset batch counter for storing data indicative of fluid volume desired, operatively associated with said shaft of said positive displacement meter to record and compare present volume to desired volume;

a solenoid activated valve disposed within said fluid flow network downstream from said positive displacement meter;

a power supply for supplying DC power;

an optical switch assembly connected to said shaft of said positive displacement meter, monitoring movement of said shaft resulting from fluid flow, and generating digital pulses in response to said movement;

electronic control circuit means electrically connected to said optical switch assembly for enabling said solenoid activated valve in response to flow rate in said fluid flow network; and a first trip switch electrically responsive to said preset batch counter and electrically connected to said electronic control circuit means for initiating a multilevel shutdown flow rate signal for inhibiting flow through the fluid flow network.

21. A flow control system as set forth in claim 20 further including a second trip switch electrically responsive to said preset batch counter and electrically connected to said electronic control circuit means for enabling said solenoid activated valve for emergency shutdown of said fluid flow system.

22. A method of electronically controlling a flow meter valve system comprising the steps of:

monitoring fluid flow in said flow system using a positive displacement meter in conjunction with a preset batch counter;

generating digital pulses representative of actual flow rate in said flow system using an optical switch assembly in conjunction with said positive displacement meter; and electronically controlling a solenoid activated valve disposed downstream in said flow system in response to said digital pulses, said step of electronically controlling a solenoid activated valve within said control system further including the steps of:

synchronizing said digital pulses to a system clock frequency;

accumulating said digital pulses in a pulse accumulator circuit for a predetermined time base, storing desired flow rate data, comparing the number of digital pulses accumulated over said time base with said flow rate data and generating a signal indicative of the difference, if any, and generating a signal in response to the comparison of digital pulses to desired flow rate and delivering said pulse to solid state relays for enabling or disabling the solenoids in the solenoid activated valve.

* * * * *